Figure 1:
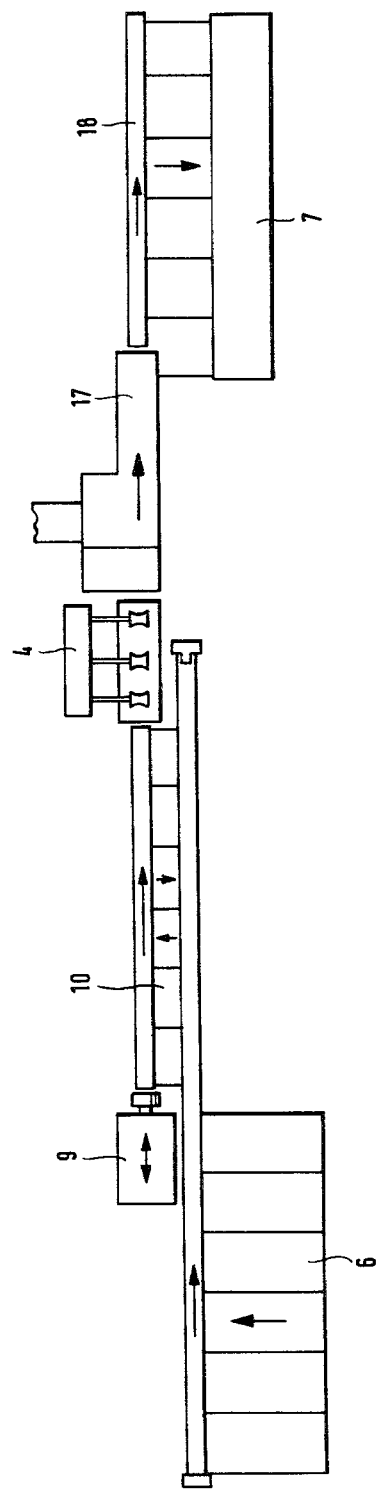

United States Patent [19]

Schweer

[11] 4,295,397
[45] Oct. 20, 1981

[54] APPARATUS FOR PEELING PIPES

[75] Inventor: Wilhelm Schweer, Leichlingen, Fed. Rep. of Germany

[73] Assignee: Th. Kieserling & Albrecht, Solingen, Fed. Rep. of Germany

[21] Appl. No.: 10,177

[22] Filed: Feb. 7, 1979

[30] Foreign Application Priority Data

Feb. 13, 1978 [DE] Fed. Rep. of Germany ....... 2805947

[51] Int. Cl.³ ................................................ B23B 5/12
[52] U.S. Cl. ....................................... 82/20; 29/27 R
[58] Field of Search ................... 29/33 T, 27 R, 27 C; 82/20; 408/22, 24, 25

[56] References Cited

U.S. PATENT DOCUMENTS

| | | | |
|---|---|---|---|
| 1,799,384 | 4/1931 | Millspaugh | 29/27 R |
| 3,350,965 | 11/1967 | Brauer et al. | 82/20 |
| 3,513,731 | 5/1970 | Michelson | 82/20 |

FOREIGN PATENT DOCUMENTS 1777011 7/1972 Fed. Rep. of Germany .......... 82/20
2501408 7/1976 Fed. Rep. of Germany ...... 29/27 C

*Primary Examiner*—Leonidas Vlachos
*Attorney, Agent, or Firm*—Edward E. Sachs

[57] ABSTRACT

Apparatus for externally and internally peeling pipes includes a drill head secured to one end of an elongated drill rod and an external cutter head longitudinally-spaced from the drill head in the direction of movement of a pipe through the apparatus. A feed mechanism is positioned adjacent the drill head for feeding a pipe completely past the drill head and at least partially through the external cutter head. An extraction feed mechanism is positioned on the opposite side of the external cutter head from the drill head for pulling pipes completely past the external cutter head. The feed mechanism adjacent the drill head includes opposed pairs of rollers, one pair of which is radially aligned with the cutters on the drill head.

7 Claims, 2 Drawing Figures

APPARATUS FOR PEELING PIPES

The invention relates generally to pipe peeling apparatus and, more particularly, to such apparatus for peeling pipes both externally and internally.

It is known to provide pipe peeling apparatus with a plurality of cutter heads which operate either simultaneously or consecutively upon a pipe. Examples of apparatus of this type include U.S. Pat. No. 3,513,731 issued May 26, 1970, to Michelson, and German OS No. 2,105,205 published Aug. 26, 1971. In apparatus of the type described in these patents, the cutter heads operate on the same surface of a pipe and simply increase the cutting performance or make different types of cuts.

In apparatus for externally peeling cylindrical bars and pipes, it is also known to provide an additional cutter for chamfering the leading end of the bar or pipe. An example of an apparatus of this type is disclosed in German AS No. 1,777,011.

It is also known to provide an apparatus for internally drilling or peeling pipes by securing a drill head to one end of a drill rod and longitudinally pulling the drill rod for pulling the drill head through the pipe. An example of an apparatus of this type is disclosed in German Utility Model No. 7,622,259 granted Jan. 27, 1977.

It is often desirable or necessary to peel pipes both externally and internally. Arranging independent external and internal pipe peeling machines, one after another, for consecutively peeling pipes internally and externally is a very expensive and complicated arrangement which requires a large amount of space and considerable handling of the pipes.

It is therefore the primary object of the present invention to provide an apparatus for externally and internally peeling pipes in a relatively simple and inexpensive manner.

It is a further object of the invention to provide such an apparatus with a common feed mechanism positioned adjacent an internal cutter head for feeding pipes completely past the internal cutter head and at least partially past the external cutter head.

It is an additional object of the invention to provide such an apparatus with independent variable speed drives for the internal and external cutter heads for independently rotatably driving such cutter heads at variable speeds.

An aspect of the present invention resides in a pipe peeling apparatus having a rotatably driven external cutter head longitudinally-spaced from a rotatably driven internal cutter head in the direction of movement of a pipe through the apparatus. A common feed mechanism is positioned adjacent the internal cutter head for feeding pipes longitudinally completely past the internal cutter head and at least partially past the external cutter head. An extraction feed mechanism is positioned on the opposite side of the external cutter head from the common feed mechanism for completely pulling pipes past the external cutter head.

In a preferred arrangement, the internal cutter head comprises a drill head secured to one end of an elongated drill rod which is rotatably driven. The pipe is initially positioned over the drill rod and is longitudinally driven over the drill rod past the drill head by operation of the common feed mechanism.

The common feed mechanism preferably includes a plurality of opposed pairs of guiding and driving rollers engaging a pipe. One opposed pair of such rollers is radially aligned with the cutters on the drill head for holding the pipe against vibration.

The apparatus may be used for peeling pipes either externally or internally, or both. The apparatus may also be used for externally peeling cylindrical bars.

For a better understanding of the present invention, together with other and further objects thereof, reference is had to the following description taken in connection with the accompanying drawings, and its scope will be pointed out in the appended claims.

Figure 2:
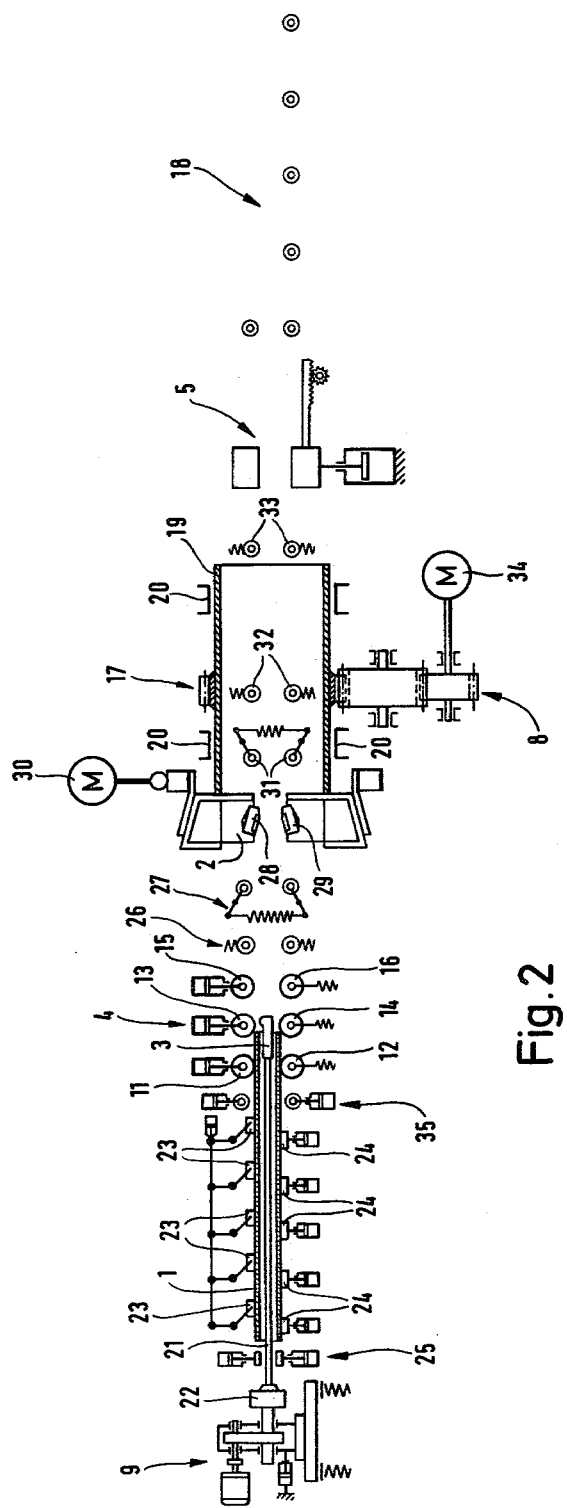

In the drawings:

FIG. 1 is a diagrammatic plan view of a pipe peeling apparatus constructed in accordance with the present application; and FIG. 2 is a side elevational view of the pipe peeling apparatus of FIG. 1, and with portions cut-away for clarity of illustration.

Referring now to the drawing, the pipe peeling apparatus includes a feed grid 6 on which pipes are deposited in a direction transversely of their longitudinal axes. A threading device 10 follows the feed grid 6 for positioning a pipe over an elongated drill rod having a drill head secured to one end thereof. A pipe and drill rod assembly are longitudinally moved relative to one another until the pipe is received over the drill rod, with the drill head extending out of the leading end of the pipe, and with the free end of the drill rod opposite from the drill head extending out from the trailing end of the pipe for connection to a drive coupling or chuck.

A drive mechanism 9 is provided for rotatably driving elongated drill rod 21 having an internal cutter head in the form of a drill head 3 secured to one end thereof. A separable drive coupling or chuck 22 is provided for imparting rotation to the drill rod 21 from the drive mechanism 9.

Feed means for feeding a pipe longitudinally through the apparatus includes a common feed mechanism 4 having a plurality of opposed pairs of rotatably driven guiding and driving rollers 11-12, 13-14 and 15-16. Common feed mechanism 4 is positioned closely adjacent the drill head 3, and one opposed pair of rollers 13-14 is preferably radially aligned with the cutters on the drill head 3 for securely supporting the pipe 1 as it moves past the drill head 3 to prevent vibrations.

An external peeling device 17 includes a rotatable hollow shaft 19 carrying an external cutter head 2 and being rotatably mounted in housing 20. The external cutter head 2 carries radially adjustable cutters 28, 29 which can be adjusted inwardly and outwardly while the cutter head 2 is rotating by operation of a motor 30.

The feed means for feeding the pipe 1 longitudinally past the cutter heads 2, 3 includes an extraction feed mechanism 5 for completely pulling the pipe past the external cutter head 2. An outlet roller table 18 and a receiving trough 7 are provided after the extraction feed mechanism 5 for receiving peeled pipes therefrom.

Except for the short transverse feeds from the infeed grid 6 to the threading device 10, from the roller table 18 to the receiving trough 7 and from the threading device 10 into the chuck 22, the components of the apparatus are arranged consecutively in alignment in the direction of movement of the pipe to be peeled. The drive mechanism 9 for the drill rod 21 and the drill head 3 is longitudinally aligned with the common feed mechanism 4, as well as being aligned with the external peeling device 17 and the extraction feed mechanism 5.

Opposed clamping elements 23, 24 are provided between the drive mechanism 9 and common feed mechanism 4 for holding and guiding the pipe 1 as it is fed longitudinally past the drill head 3 by the common feed mechanism 4. The clamping elements 23, 24 allow the pipe 1 to slide longitudinally therepast. Support and transport means 25, 35 are provided at opposite ends of the clamping elements 23, 24 for supporting and transporting the drill rod 21 and the drill head 3 upon completion of the internal peeling process. After the pipe 1 has been completely driven longitudinally past the drill head 3 by the feed mechanism 4, the drill rod 21 and the drill head 3 are supported by the devices 25, 35 while the chuck 22 is released from the drill rod 21. The drill rod and drill head are then moved transversely out of the apparatus while a new assembly of another pipe and drill rod with a drill head are moved into the apparatus from the threading device 10.

The distance between the chuck 22 and the common feed mechanism 4 determines the longest length of pipe which can be processed internally. The length of the drill rod 21 is such that when it is clamped in the chuck 22 the cutters on the drill head 3 are in substantially radial alignment with a pair of rollers 13-14 of the common feed mechanism 4.

Centering and guiding rollers 26, 27 are provided between the common feed mechanism 4 and the external cutter head 2 for centering and guiding the pipe 1. Additional centering and guiding rollers 31, 32 and 33 are positioned within the hollow shaft 19 of the external peeling device 17.

A rotatable drive means 8 for the hollow shaft 19 or for the external cutter head 2 includes a variable speed motor 34 which rotatably drives the shaft 19 through a plurality of toothed gears. The drive means 8 and 9 are preferably independent and are capable of independent variable speed operation. This makes it possible to rotate the drill rod 21 and the drill head 3 at a slower speed when initiating the internal peeling operation. Once a pipe is being acted upon simultaneously by both the external and the internal cutter heads 2 and 3, it is possible to rotatably drive such cutter heads at a greater speed because they are rotatably driven in opposite directions and counteract one another to minimize the torque on the pipe. Once the pipe has moved completely past the drill head 3, the drive speed of the external cutter head may be slowed for finishing the remainder of the external peeling.

As soon as a pipe moves free of the common feed mechanism 4, or substantially simultaneously therewith, the extraction feed mechanism 5 takes over to longitudinally pull the pipe completely past the external cutter head 2 and feed same onto the roller table 18 from which it is shifted transversely into the trough 7 by a shifting device which is not shown. The feed mechanisms 4 and 5 are also preferably of variable speed types for peeling of the pipes at different speeds at the beginning and the end of the peeling operation when it is difficult to adequately clamp thin pipes. Separate variable speed control of the drives for the pipe and cutter heads permits different cutting velocities and cutting widths in the initial and final peeling phases, which is before or after the simultaneous internal and external peeling operation.

While there has been described what is at present considered to be the preferred embodiment of this invention, it will be obvious to those skilled in the art that various changes and modifications may be made therein without departing from the invention, and it is aimed, therefore, in the appended claims to cover all such changes and modifications which fall within the true spirit and scope of the invention.

What is claimed is:

1. Apparatus for peeling pipes comprising: internal and external independent rotatably driven cutter heads for peeling a pipe, said cutter heads being positioned sufficiently close together for simultaneous peeling of a pipe over at least a portion of the pipe length, feed means for non-rotatably longitudinally feeding a pipe past said cutter heads, and said internal cutter head being in the form of a drill head secured to one end of an elongated drill rod which extends through the pipe and along which the pipe is fed by said feed means including independent variable speed drive means for each said cutter head for independently driving each said cutter head at a desired speed.

2. The apparatus of claim 1 wherein said external cutter head is spaced from said drill head in the direction of movement of the pipe, said feed means including a feed mechanism positioned axially closely adjacent said drill head and externally engaging the pipe for minimizing vibration of the pipe due to peeling action of said drill head.

3. The apparatus of claim 1 wherein said feed means includes a common feed mechanism positioned on one side of said external cutter head toward said internal cutter head and an extraction feed mechanism positioned on the opposite side of said external cutter head, and independent variable speed drive means for each said common and extraction feed mechanism for independently varying the speed at which a pipe is fed longitudinally through said apparatus.

4. Apparatus for externally and internally peeling pipes comprising: a rotatably driven internal cutter head, an external cutter head longitudinally-spaced from said internal cutter head in the direction of movement of a pipe through said apparatus so that said external cutter head externally peels a pipe moving longitudinally through said apparatus subsequent to internal peeling thereof by said internal cutter head, feed means for non-rotatably feeding a pipe longitudinally past said cutter heads, said feed means including a common feed mechanism positioned on one side of said external cutter head toward said internal cutter head for feeding a pipe longitudinally completely past said internal cutter head and at least partially past said external cutter head, and said internal and external cutter heads being positioned sufficiently close together for internally and externally peeling a pipe simultaneously over at least a portion of the pipe length including independent variable speed drive means for each of said cutter heads for independently driving each said cutter head at a desirable speed.

5. The apparatus of claim 4 wherein said internal cutter head comprises a drill head secured to one end of an elongated drill rod along which a pipe moves longitudinally past said drill head, said apparatus including a pipe feed grid, means for positioning a pipe over said drill rod, a drill rod support and rotatable drive mechanism laterally of said means for positioning, said feed means including opposed pairs of rotatably driven guiding and driving rollers positioned axially adjacent said drill head in external engagement with the pipe, said feed means including an extraction feed mechanism positioned on the opposite side of said external cutter head from said guiding and driving rollers for pulling a pipe completely past said external cutter head, and a receiving trough for receiving pipes from said extraction feed mechanism.

6. The apparatus of claim 4 wherein said feed means includes an extraction feed mechanism positioned on the opposite side of said external cutter head from said common feed mechanism, and independent variable speed drive means for each said common and extraction feed mechanism for independently varying the speed at which a pipe is fed longitudinally through said apparatus.

7. The apparatus of claim 6 wherein said common feed mechanism is axially closely adjacent said internal cutter head and includes opposed rollers for engaging the external surface of a pipe closely adjacent said internal cutter head for holding said pipe against vibration during internal peeling thereof by said internal cutter head.

* * * * *